Figure 1:
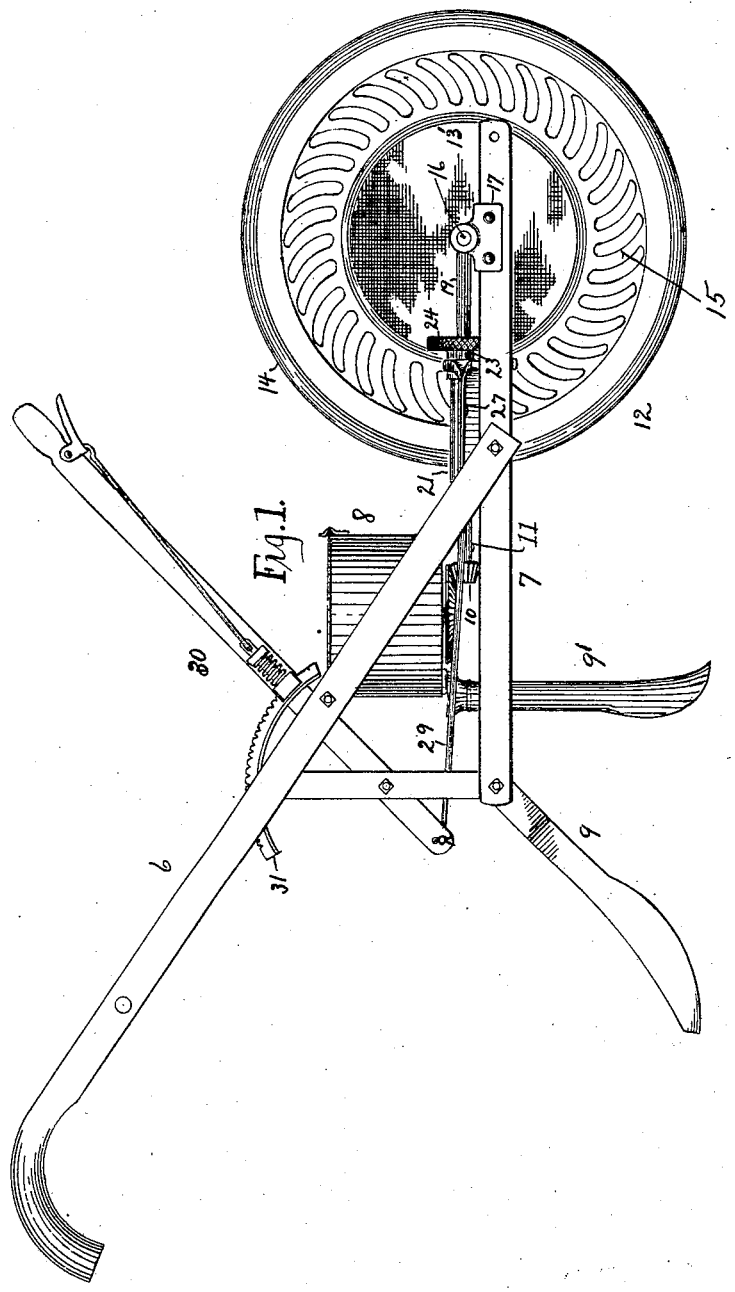

No. 855,787. PATENTED JUNE 4, 1907.
W. KIRN.
CORN DRILL.
APPLICATION FILED OCT. 4, 1906.

2 SHEETS—SHEET 1.

Witnesses.
B.T. Fisher

Inventor.
William Kirn
By J. A. Rosen atty

No. 855,787. PATENTED JUNE 4, 1907.
W. KIRN.
CORN DRILL.
APPLICATION FILED OCT. 4, 1906.
2 SHEETS—SHEET 2.
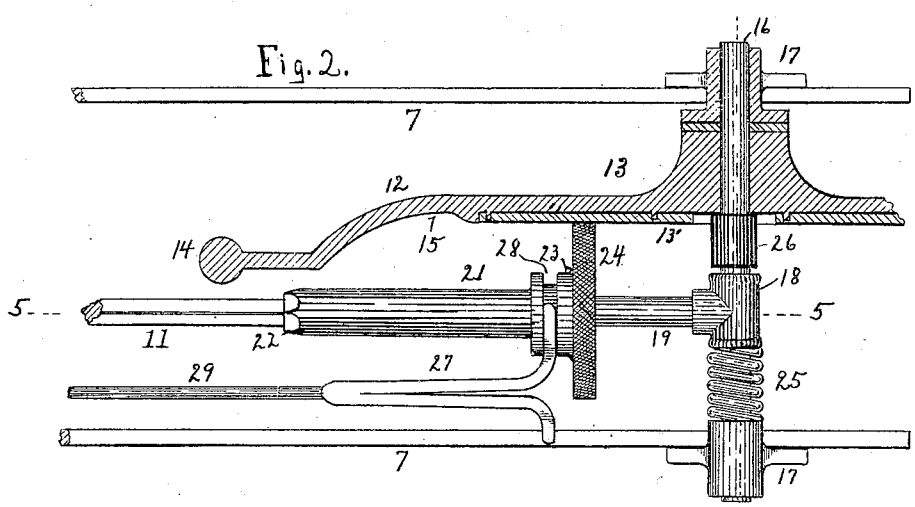
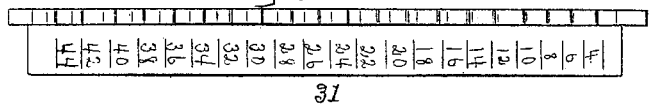
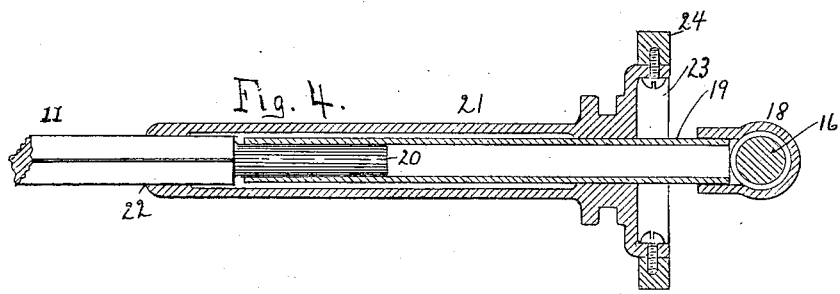
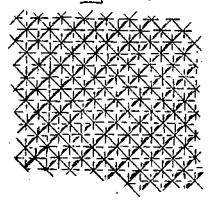
Witnesses. Inventor.

UNITED STATES PATENT OFFICE.

WILLIAM KIRN, OF ROSSVILLE, KANSAS.

CORN-DRILL.

No. 855,787.      Specification of Letters Patent.      Patented June 4, 1907.

Application filed October 4, 1906. Serial No. 337,484.

*To all whom it may concern:*

Be it known that I, WILLIAM KIRN, a citizen of the United States, and a resident of the city of Rossville, in the county of Shawnee and State of Kansas, have invented a new and useful Improvement in Corn-Drills, of which the following is a specification.

The objects of my invention are to improve generally upon corn drills; to provide a simple and efficient mechanism for dropping the kernels of seed corn at any desired spaces apart, and to change the spaces at which they are dropped, by a controlling lever, without stopping the horse or team.

The invention consists of a simple and efficient friction-gear arrangement which can be adjusted to any desired degree while the drill is in action, and it further consists of the parts, improvements, and combinations herein shown, described, and claimed.

In the drawings Figure 1 is a side elevation of the corn-drill complete embodying my invention. Fig. 2 is a plan view of the gear and adjacent parts, the main wheel being shown in part section. Fig. 3 is an enlarged view of the rack and scale for the controlling lever. Fig. 4 is a section on the line 5—5 of Fig. 2, and Fig. 5 is a representation of the roughened face of the small friction-gear rim.

Similar reference numerals indicate similar parts throughout the several views.

6 represents the handles of an ordinary one-horse corn drill, and 7, 7 are the side pieces of the frame.

8 indicates the seed-can or hopper.

9, 9 are the cover blades, 9' is the furrow opener and 10 is the gearing for the dropping mechanism, 11 being the rod by which it is driven.

12 is the main wheel, and for my invention it is preferably of peculiar shape, the middle portion 13 being somewhat "dished," so that the hub may be set at one side between the side-pieces 7, 7, and permit the rim 14 to be disposed about midway between them. Attached to the inner face of the wheel web is a detachable friction plate 13', while the main wheel is formed with a slight depression 15 just outside this plate.

16 is the shaft mounted in suitable bearings 17, 17.

18 is a T coupling mounted on the shaft 16 and 19 is a pipe coupling fitted into the leg of the T coupling. 20 is the rounded end of the operating rod 11 which fits loosely into said pipe 19.

21 is a larger pipe fitting outside the pipe 19, its end being squared, 22, is an opening to correspond with the similarly squared portion of the rod 11; and the other end of the large pipe 21 is provided with a web 23 which carries a detachable friction-tire or rim 24.

25 is a compression spring tending to force the T coupling toward the main wheel, and 26 is a long washer or tube on the shaft to limit the movement of said T coupling.

27 is a two-pronged spring normally pressed apart, one of the prongs engaging a groove 28 in the larger pipe 21, and the other engaging the side-piece 7 as a guide.

29 is a connecting rod secured to the member 27 and 30 is the controlling lever, and 31 is the rack for the lever suitably provided with notches and indicating numerals, this particular system of numerals indicating the number of inches apart which the drill is adjusted to drop the kernels.

The turning of the wheel and disk or plate 13' also turns the friction wheel 24, and this operates the dropping mechanism. In order to prevent slipping, I prefer to make the surfaces roughened, as indicated in Fig. 5, as wet weather will not cause these surfaces to slip. When the lever 30 is thrown farthest forward, the friction wheel 24 will be over the channel or depression 15 and out of contact with the main wheel, as the collar 26 prevents the spring 25 from pushing it over too far. When the lever is shifted the wheel 24 is thrown onto the disk 13', and as the spring presses it against the disk, it will of course be caused to rotate with the large disk. At the circumference the rate of speed of the smaller gear will be high, but as it is shifted toward the shaft 16, the rate of speed is much reduced. This rate may be shown on a scale 31 on the rack for the controlling lever, as shown in Fig. 3. Though it may not be easy to shift the small friction gear when the large wheel is at a stand-still, it is quite easy to shift it while the large wheel is in motion, and in this feature I have a distinct advantage over other corn-drills, in that I can adjust my drill to any range while the planter is in action, and can thus drop the seeds at such distances apart as are best adapted to the particular soil traversed.

What I claim is:

1. In a corn-drill, the combination with a frame and seed-dropping mechanism mounted therein, of a main wheel having its middle portion dished that its hub may be mounted to one side and permit its rim to be disposed about the middle of the frame, said wheel having a removable friction plate with its face roughened, and an annular depression outside said plate, a shaft in the frame on which the wheel is mounted, a T coupling mounted on the shaft, a compression spring for the T coupling, and a collar for limiting the movement of the T coupling, a pipe secured to the T coupling, a squared operating rod for the seed-dropping mechanism having a rounded forward end extending loosely into said pipe, a larger pipe mounted on said first-mentioned pipe and having its end squared to engage with the squared portion of the operating rod, a wheel connected with the larger pipe and a removable friction rim therefor, a groove in said larger pipe, a spring-pressed yoke engaging the collar, an operating lever therefor, and a graduated scale for indicating the number of inches apart that the seeds are dropped.

2. In a corn-drill, the combination with the handles, the frame, the main wheel, the seed-dropping mechanism, and the operating rod therefor, of a friction-disk removably secured to said wheel, and an annular depression around the same, a spring-pressed friction-gear engaging said friction-disk and slidably mounted on said operating rod, and suitable controlling lever and connecting mechanism between said friction-gear and said lever.

3. In a corn-drill, the combination with the handles, the frame, the main wheel, the seed-dropping mechanism and the operating rod therefor, of a roughened friction-disk detachably secured to the wheel, a shaft for the wheel, a bearing for the operating-rod slidably mounted on said shaft, a compression spring for pressing the rod toward the disk, and a collar on the shaft for limiting the movement toward the disk, a friction wheel having a detachable and roughened rim for engaging the friction disk, said wheel being slidably mounted on said operating-rod and being adapted to operate said rod, and an operating lever for controlling the said wheel.

WILLIAM KIRN.

Witnesses:
F. F. ANDERSON,
G. W. ANDERSON.